United States Patent [19]

Ticknor

[11] Patent Number: 5,100,589
[45] Date of Patent: Mar. 31, 1992

[54] OPTICAL METHOD FOR ALTERING MOLECULAR ALIGNMENT IN SELECTED REGIONS OF A NON-LINEAR OPTICAL POLYMERIC STRUCTURE

[75] Inventor: Anthony J. Ticknor, Cupertino, Calif.

[73] Assignee: Lockheed Missiles & Space Company, Inc., Sunnyvale, Calif.

[21] Appl. No.: 445,526

[22] Filed: Dec. 4, 1989

[51] Int. Cl.$^5$ ............................................. G02F 1/00
[52] U.S. Cl. ...................... 264/1.3; 264/1.4; 264/22; 264/24; 425/174.4; 425/174.8 R; 385/14; 385/122; 385/132
[58] Field of Search ................... 264/24, 22, 108, 104, 264/1.3, 1.4, 1.5; 307/425; 350/96.12, 3.64, 96.34; 252/582; 425/174.8 R, 174.8 E, 174.4, 174.6

[56] References Cited

U.S. PATENT DOCUMENTS

| | | | |
|---|---|---|---|
| 3,170,008 | 2/1965 | Levine | 264/22 |
| 3,665,206 | 5/1972 | Bergman, Jr. et al. | 307/425 |
| 4,582,655 | 4/1986 | Greener | 264/1.5 |
| 4,673,241 | 6/1987 | Nishiwaki et al. | 350/96.34 |
| 4,711,514 | 12/1987 | Tangonan et al. | 350/96.34 |
| 4,792,208 | 12/1988 | Ulman et al. | 264/1.3 |
| 4,796,971 | 1/1989 | Robello et al. | 350/96.34 |
| 4,822,682 | 4/1989 | Dorsch et al. | 427/54.1 |
| 4,859,876 | 8/1989 | Dirk et al. | 252/582 |
| 4,886,538 | 12/1989 | Mahapatra | 264/1.3 |
| 4,909,598 | 3/1990 | Ninomiya et al. | 350/96.34 |
| 4,925,263 | 5/1990 | Sanford et al. | 307/425 |

Primary Examiner—Jeffery Thurlow
Attorney, Agent, or Firm—John J. Morrissey

[57] ABSTRACT

A channel waveguide is integrally formed within a structure made of a non-linear optical polymer by focussing a beam of optical radiation into a specified region within the structure where the channel waveguide is to be located. The focussed beam of optical radiation raises the temperature of the polymer in the specified region to above the glass-transition temperature for the polymer. A poling electric field is applied to the structure to cause molecular alignment of the polymer to occur in the specified region of the structure. Then the beam of optical radiation is removed while the poling electric field is maintained, thereby maintaining molecular alignment of the polymer in the specified region as the temperature of the specified region falls below the glass-transition temperature. A change in index of refraction of the polymer in the specified region of the structure due to the molecular alignment of the polymer in the specified region enables the specified region to function as a channel waveguide.

28 Claims, 2 Drawing Sheets

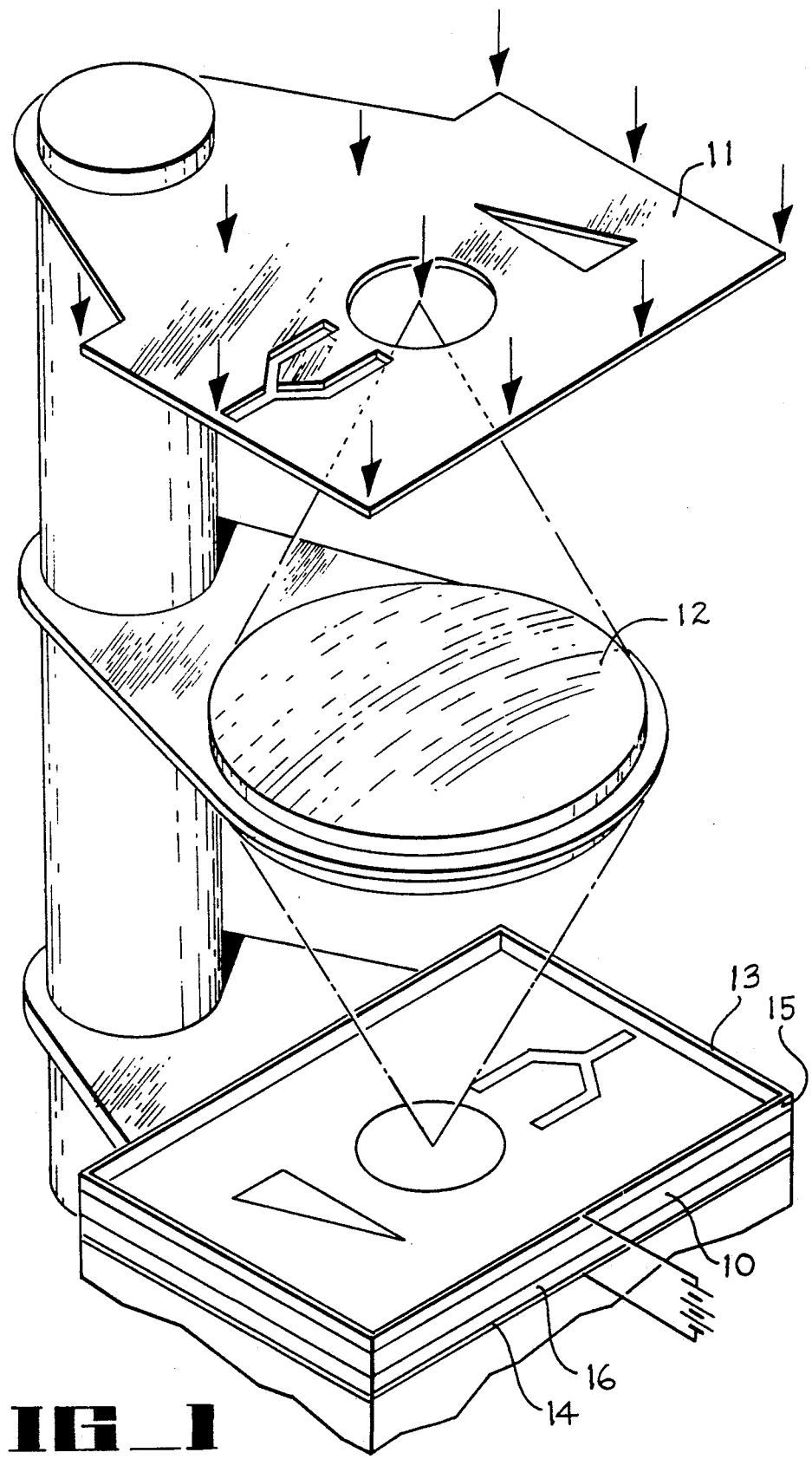

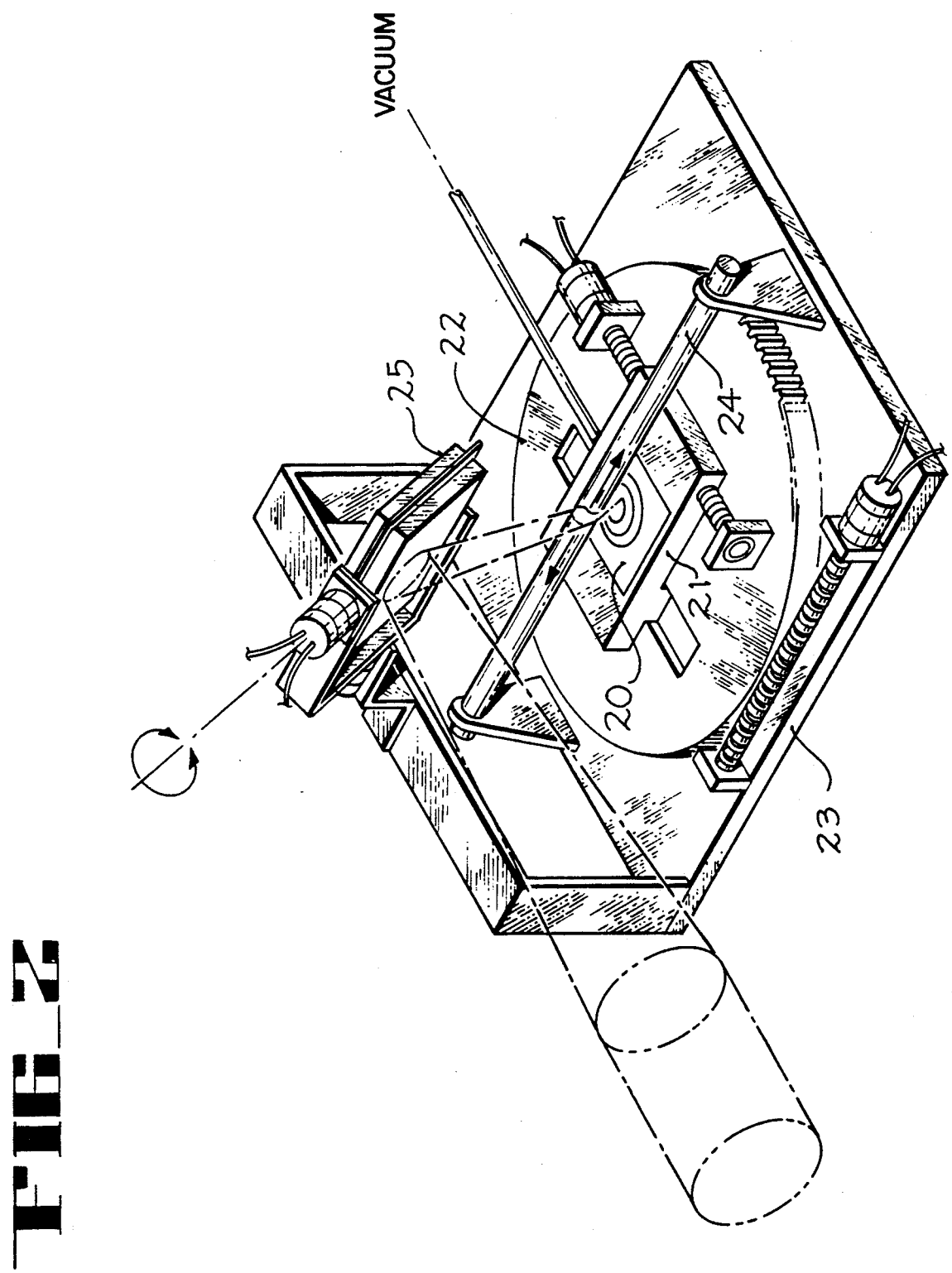
FIG_2

OPTICAL METHOD FOR ALTERING MOLECULAR ALIGNMENT IN SELECTED REGIONS OF A NON-LINEAR OPTICAL POLYMERIC STRUCTURE

TECHNICAL FIELD

This invention relates generally to integrated optical devices made from organic electro-optical materials, and more particularly to an optical technique for forming integrated-optic elements in a non-linear optical polymeric structure.

BACKGROUND OF THE INVENTION

U.S. Pat. No. 5,006,285 describes a technique whereby a channel waveguide can be formed in a structure made of a non-linear optical polymer by heating the structure to a temperature above the glass-transition temperature for the polymer, and by applying an electric field to patterned electrodes positioned adjacent the structure so as to "pole" (i.e., to induce molecular alignment in) the polymer in a predetermined elongate region of the structure according to a pattern as determined by the patterned electrodes. The polymeric structure is then cooled below the glass-transition temperature for the polymer and the applied electric field is removed, thereby "freezing" the predetermined elongate region of the structure in a poled state to function as a channel waveguide. The disclosure in U.S. Pat. No. 5,006,285 is incorporated herein by reference.

SUMMARY OF THE INVENTION

It is an object of the present invention to provide an optical technique for selectively altering molecular alignment in a specified region of a non-linear optical polymeric structure (i.e., for "poling" the specified region) in order to form an optically refractive element (e.g., a channel waveguide) within the polymeric structure.

In accordance with the present invention, directed optical radiation of a frequency (or frequency band) that is strongly absorbed by the polymer of which the structure is made is used to heat just the specified region of the structure in which the optically refractive element is to be formed. The specified region (and not the entire structure) is heated to a temperature above the glass-transition temperature for the polymer; and an electric field is applied to the structure to produce poling only in the specified region that has been heated above the glass-transition temperature.

It is a feature of the present invention that an optically refractive element is integrally formed in a specified region of a structure made of a non-linear optical polymer by producing different states of molecular alignment of the polymer inside and outside the specified region. The different states of molecular alignment result in concomitantly different indices of refraction and electro-optic susceptibility of the polymer inside and outside the specified region of the polymeric structure. The configuration of the specified region, and hence of the optically refractive element formed therein, is defined by a predetermined pattern according to which directed optical radiation enters into the structure to heat the polymer, and by the shape of the electrodes or other means used to apply the poling electric field to the heated polymer.

In a particular application of the present invention, a channel waveguide is produced integrally within a structure made of a non-linear optical polymer by using an anamorphic lens (e.g., an elongate cylindrical lens) to focus a laser beam at a predetermined depth within the structure, and by using a high-speed optical scanner to move the focussed laser beam along the anamorphic lens so as to heat a correspondingly elongate region at that predetermined depth within the structure to a temperature above the glass-transition temperature of the polymer. The configuration of the heated elongate region within the structure is determined by the configuration of the anamorphic lens. A poling electric field is applied to the structure to change the state of molecular alignment of the polymer within the heated elongate region. The poling electric field is maintained as the focussed laser beam is then removed, thereby "freezing" the changed state of molecular alignment in the elongate region so as to form the channel waveguide.

DESCRIPTION OF THE DRAWING

FIG. 1 is an illustration in perspective view of an apparatus according to the present invention for selectively altering molecular alignment in specified regions of a non-linear optical polymeric structure.

FIG. 2 is an illustration in perspective view of an apparatus according to the present invention for forming a channel waveguide in a non-linear optical polymeric structure.

BEST MODE OF CARRYING OUT THE INVENTION

FIG. 1 illustrates a relatively simple procedure in accordance with the present invention for selectively altering molecular alignment in specified regions of a non-linear optical (NLO) polymeric structure 10. As shown in FIG. 1, a transmittance mask 11 is positioned in an illuminating field generated by a flood source of optical radiation such as a high-intensity flashlamp, an expanded laser beam source, the sun, etc., so as to shadow the polymeric structure 10 from the illuminating field. Apertures in the transmittance mask 11 have configurations corresponding to the configuration desired for the specified regions of the polymeric structure 10 in which the molecular alignment is to be altered. The apertures in the transmittance mask 11 are imaged by means of a conventional imaging lens 12 onto a focal plane at a desired depth within the polymeric structure 10. Optical radiation transmitted through the apertures in the transmittance mask 11 is absorbed by the polymeric structure 10 at the focal plane, thereby causing the specified regions of the polymeric structure 10 to be heated to a temperature above glass-transition temperature.

The polymeric structure 10 is covered by an electrode 13, which is substantially transparent to the optical radiation transmitted by the transmittance mask 11. In practice, the transparent electrode 13 could be an indium tin oxide (ITO) coating deposited on a glass plate. An electric field is established by applying a difference of electrical potential between the transparent electrode 13 and another electrode 14, which is preferably made of a metallic sheet placed beneath the polymeric structure 10. Sheets 15 and 16 made of a polymeric material having an index of refraction lower than the index of refraction of the polymeric structure 10 are placed on respective sides of the polymeric structure 10 to act as electrical and optical buffers. The polymeric sheets 15 and 16 are preferably likewise transparent to the optical radiation transmitted by the transmittance mask 11.

The electric field established between the electrodes 13 and 14 acts as a poling field to alter molecular alignment in the specified regions of the polymeric structure 10. Once a desired degree of poling has occurred, heating of the specified regions of the polymeric structure 10 is discontinued by removing or blocking the illuminating field of optical radiation. The poling electric field remains in place as the specified regions of the polymeric structure 10 are allowed to cool to the same temperature as adjacent regions thereof, thereby keeping the polymer in the specified regions of the polymeric structure 10 in a poled state while the temperature of the polymer in the specified regions remains above the glass-transition temperature. After the polymer in the specified regions has cooled below the glass-transition temperature, the poling (i.e., the altered molecular alignment) in the specified regions becomes "frozen", and the poling electric field is removed.

An alternative technique for applying an electric field to the polymeric structure 10 is to produce an electrical corona adjacent one surface thereof. Thus, instead of using a pair of electrodes as illustrated in FIG. 1, a sharply pointed needle electrode is positioned so that its tip lies adjacent (typically within about five mm of) one surface of the polymeric structure 10, and a grounded plate electrode is placed adjacent (preferably in contact with) an opposite surface of the polymeric structure 10. A difference of electrical potential sufficient to ionize the air in the vicinity of the tip of the needle electrode is applied between the electrodes. The resulting ionization of the air causes electrical charges to be deposited on the one surface of the polymeric structure 10, thereby creating an electrical field (typically on the order of 200 volts per micron) within the polymeric structure 10 between the charges on the one surface thereof and the grounded plate electrode adjacent the opposite surface thereof. This electric field within the polymeric structure 10 causes molecular alignment of the polymer to occur in those specified regions thereof that have been heated above the glass-transition temperature.

FIG. 2 illustrates a technique according to the present invention for forming a channel waveguide in an NLO polymeric structure. A laminar assembly 20 comprising the polymeric structure 10 with electrodes 13 and 14 and buffer sheets 15 and 16, as illustrated in FIG. 1, is shown in FIG. 2 fixedly mounted on a vacuum chuck 21, which is secured to a table 22 for translational motion thereon. The table 22 is mounted for rotational motion on a platform 23. Thus, the laminar assembly 20 can be made to assume any desired two-dimensional orientation with respect to the platform 23 by appropriate adjustment of the translational position of the chuck 21 and the rotational position of the table 22.

A cylindrical lens 24 is mounted on the platform 23 so as to extend transversely over the chuck 21. A mirror 25 is also mounted on the platform 23. A source of optical radiation (e.g., an expanded laser beam source), not shown in FIG. 2, is positioned so as to direct a converging beam of optical radiation onto the mirror 25. The beam of optical radiation is of a frequency that is strongly absorbed by the polymeric structure 10 in the laminar assembly 20, and the mirror 25 is mounted so that the beam is focussed through the cylindrical lens 24 onto a focal plane at a desired depth within the polymeric structure 10. The mirror 25 is mounted for rotational motion about an appropriate axis so that the beam can be moved longitudinally along the cylindrical lens 24, thereby enabling a small spot of focussed optical radiation to be scanned along a line within the polymeric structure 10.

Translational and rotational motions of the chuck 21 and the table 22, respectively, and rotational motion of the mirror 25, can be programmed by a conventional numerical control (NC) method so that a heated region having the configuration desired for the channel waveguide is formed (i.e., "written" as a result of the optical scanning) by the focussed beam on the focal plane at the desired depth within the polymeric structure 10. A poling electric field is applied to the laminar assembly 20 (e.g., by the technique described above in connection with the embodiment of the invention shown in FIG. 1) while the heated region is maintained at a temperature above the glass-transition temperature, thereby causing molecular alignment of the polymer in the heated region. The poling electric field is maintained as the focussed beam of optical region is then removed, thereby "freezing" the molecular alignment in the region that is to become the channel waveguide.

With the apparatus shown in FIG. 2, the laminar assembly 20 can be reoriented so as to enable additional channel waveguides (or other types of optically refractive elements) to be formed in the polymeric structure 10 without affecting channel waveguides previously formed therein. It is also possible to heat a previously formed channel waveguide (or other type of optically refractive element), with zero electric field within the polymeric structure 10, to a temperature sufficient to randomize the molecular alignment therein, thereby effectively "erasing" the previously formed channel waveguide (or other type of optically refractive element) without affecting the physical integrity of the polymeric structure 10. In order to control diffusion to heat within the polymeric structure 10, the converging beam of optical radiation directed onto the mirror 25 can be pulsed at a repetition rate sufficiently low to ensure that heating above glass-transition temperature occurs only in the specified region where the channel waveguide (or other type of optically refractive element) is to be formed. Precise control of the diffusion of heat within the polymeric structure 10 facilitates formation of sharply defined edges for the channel waveguide (or other type of optically refractive element) that is to be formed.

The technique of the present invention has been described herein in terms of particular embodiments. However, other embodiments of apparatuses according to the present invention would become apparent to practitioners skilled in the art upon persual of the foregoing specification and the accompanying drawing. Accordingly, the foregoing description is to be considered as merely illustrative of the invention, which is defined more generally by the following claims and their equivalents.

I claim:

1. A method of forming an optically refractive element at a specified depth within a polymeric structure made of a non-linear optical polymer, said method comprising the steps of:

(a) focussing optical radiation into a specified region at said specified depth within said polymeric structure according to a pattern that defines a desired configuration for said optically refractive element, said optical radiation having a frequency that is strongly absorbed by said polymer, said optical radiation that is focussed into said specified region thereby heating said polymer in said specified region within polymeric structure to a temperature above glass-transition temperature for said polymer, said polymer outside said specified region of said polymeric structure remaining at a temperature below glass-transition temperature for said polymer;

(b) applying an electric field to said polymeric structure to induce poling of said heated polymer in said specified region in which the temperature of said polymer has been raised above glass-transition temperature, said poling of said polymer in said specified region within said polymeric structure thereby causing said polymer in said specified region to have a higher index of refraction than said polymer in an adjacent region of said polymeric structure outside said specified region; and (c) removing said focussed optical radiation from said specified region within said polymeric structure while continuing to apply said electric field to said polymeric structure so that poling of said polymer in said specified region within said polymeric structure is thereby maintained until after said specified region has been cooled to a temperature below glass-transition temperature for said polymer, said specified region within said polymeric structure thereby retaining said higher index of refraction while leaving said polymeric structure dimensionally substantially unchanged, whereby said specified region at said specified depth within said polymeric structure becomes said optically refractive element.

2. The method of claim 1 wherein the step of focussing optical radiation into said specified region within said structure comprises focussing a directed beam of said optical radiation through lens means to a focal surface in said specified region.

3. The method of claim 2 wherein said directed beam of optical radiation is a laser beam.

4. The method of claim 2 wherein said directed beam of optical radiation is pulsed.

5. The method of claim 2 wherein said directed beam of optical radiation is scanned along said specified region within said structure.

6. The method of claim 1 wherein the step of applying said electric field to said structure comprises applying a difference of electrical potential between a pair of electrodes disposed on opposite sides of said structure.

7. The method of claim 6 wherein a first electrode of said pair is substantially transparent to said optical radiation, a substantial portion of said optical radiation passing through said first electrode in being focussed into said specified region within said structure.

8. The method of claim 1 wherein the step of applying said electric field to said structure comprises producing an electrical corona adjacent said structure.

9. A method of selectively altering molecular alignment in a specified region at a specified depth within a polymeric structure consisting essentially of a non-linear optical polymer, said method comprising the steps of:

(a) focussing optical radiation into said specified region at said specified depth, said optical radiation having a frequency that is strongly absorbed by said polymer, said optical radiation focussed into said specified region thereby heating said polymer in said specified region to a temperature above glass-transition temperature for said polymer, said polymer outside said specified region remaining at a temperature below glass-transition temperature for said polymer;

(b) applying an electric field to said polymeric structure to induce poling of said heated polymer in said specified region in which the temperature of said polymer has been raised above glass-transition temperature, said poling of said polymer in said specified region within said polymeric structure thereby causing said polymer in said specified region to have a higher index of refraction than said polymer in an adjacent region of said polymeric structure outside said specified region, said polymer in said adjacent region of said polymeric structure outside said specified region remaining unpoled; and (c) removing said focussed optical radiation from said specified region within said polymeric structure while continuing to apply said electric field to said polymeric structure so that poling of said polymer in said specified region within said polymeric structure is thereby maintained until after said specified region has been cooled to a temperature below glass-transition temperature for said polymer, said specified region within said polymeric structure thereby retaining said higher index of refraction, molecular alignment in said specified region at said specified depth within said polymeric structure thus being altered while leaving said polymeric structure dimensionally substantially unchanged.

10. The method of claim 9 wherein molecular alignment in said specified region within said structure is altered from a generally poled state to a generally random state.

11. The method of claim 9 wherein molecular alignment in said specified region within said structure is altered from a generally random state to a generally poled state.

12. The method of claim 9 wherein the step of focussing optical radiation into said specified region within said structure comprises focussing a directed beam of optical radiation through lens means to a focal surface within said structure.

13. The method of claim 12 wherein said directed beam of optical radiation is a laser beam.

14. The method of claim 12 wherein said directed beam of optical radiation is pulsed.

15. The method of claim 12 wherein said directed beam of optical radiation is scanned along said specified region within said structure.

16. The method of claim 9 wherein the step of applying said electric field to said structure comprises applying a difference of electrical potential between a pair of electrodes disposed on opposite sides of said structure.

17. The method of claim 16 wherein a first electrode of said pair is substantially transparent to said optical radiation, a substantial portion of said optical radiation passing through said first electrode in being focussed into said specified region within said structure.

18. The method of claim 9 wherein the step of applying said electric field to said structure comprises producing an electrical corona adjacent a surface of said structure.

19. An apparatus for forming an optically refractive element at a specified depth within a polymeric structure made of a non-linear optical polymer, said apparatus comprising:

(a) means for focussing optical radiation into a specified region at said specified depth within said polymeric structure according to a pattern that defines a desired configuration for said optically refractive element, said optical radiation having a frequency that is strongly absorbed by said polymer so that said optical radiation when focussed into said specified region thereby heats said polymer in said specified region to a temperature above glass-transition temperature for said polymer, said polymer outside said specified region of said polymeric structure remaining at a temperature below glass-transition temperature for said polymer;

(b) means for applying an electric field to said polymeric structure to induce poling of said heated polymer in said specified region in which the temperature of said polymer has been raised above glass-transition temperature, said poling of said polymer in said specified region within said polymeric structure thereby causing said polymer in said specified region to have a higher index of reaction than said polymer in an adjacent region of said polymeric structure outside said specified region, said polymer in said adjacent region of said polymeric structure outside said specified region remaining unpoled; and (c) means for removing said focussed optical radiation from said specified region within said polymeric structure while said electric field continues to be applied to said polymeric structure so that poling of said polymer in said specified region of said polymeric structure is thereby maintained until after said specified region has been cooled to a temperature below glass-transition temperature for said polymer, said specified region within said polymeric structure thereby retaining said higher index of refraction while leaving said polymeric structure dimensionally substantially unchanged, said optically refractive element thereby being formed in said specified region within said polymeric structure.

20. The apparatus of claim 19 wherein said means for focussing said optical radiation into said specified region within said structure comprises means for focussing a directed beam of said optical radiation through lens means to a focal surface in said specified region.

21. The apparatus of claim 20 wherein said lens means comprises an anamorphic lens positionable adjacent said structure, said anamorphic lens serving to focus said optical radiation so as to produce a rise in temperature of said polymer in said specified region to above glass-transition temperature for said polymer, said anamorphic lens having a configuration corresponding to said pattern defining said desired configuration for said optically refractive element.

22. The apparatus of claim 20 further comprising a laser device for providing said directed beam of optical radiation.

23. The apparatus of claim 20 further comprising means for scanning said directed beam of optical radiation on said focal surface in said specified region.

24. The apparatus of claim 20 further comprising means for scanning said directed beam of optical radiation along said anamorphic lens in order to focus said optical radiation into said specified region according to said pattern.

25. The apparatus of claim 21 wherein said anamorphic lens comprises an elongate cylindrical lens.

26. The apparatus of claim 19 wherein said means for applying said electric field to said structure comprises a pair of electrodes positionable on opposite sides of said structure.

27. The apparatus of claim 19 wherein a first electrode of said pair is substantially transparent to said optical radiation, whereby a substantial portion of said optical radiation can pass through said first electrode in being focussed into said specified region within said structure.

28. The apparatus of claim 19 wherein said means for applying said electric field to said structure comprises means for producing an electrical corona adjacent said structure.

* * * * *